United States Patent [19]

Paillaud et al.

[11] 4,052,139

[45] Oct. 4, 1977

[54] METHOD AND APPARATUS FOR IMPROVING THE ENERGY YIELD OF A REACTION

[76] Inventors: Pierre Paillaud, 14930 Eterville par Maltot (Calvados); Jöel Raymond, 177, rue de Bretagne, 14760 Bretteville sur Odon (Calvados), both of France

[21] Appl. No.: 631,226

[22] Filed: Nov. 12, 1975

[30] Foreign Application Priority Data

Nov. 12, 1974 France .................................. 74.37320

[51] Int. Cl.² ............................................. F23B 7/00
[52] U.S. Cl. ...................................... 431/2; 123/1 A; 123/119 E
[58] Field of Search ................... 431/2, 4, 8; 137/3, 137/5, 6; 123/1 A, 3, 119

[56] References Cited

U.S. PATENT DOCUMENTS

| | | | |
|---|---|---|---|
| 1,939,302 | 12/1933 | Heaney | 123/119 E UX |
| 2,463,569 | 3/1949 | Smith | 157/1 R X |
| 2,576,450 | 11/1951 | De Marval | 123/119 E X |
| 2,704,535 | 3/1955 | Magui et al. | 123/119 E X |
| 3,306,338 | 2/1967 | Wright et al. | 431/2 X |
| 3,679,560 | 7/1972 | Mezey | 204/157.1 S |
| 3,749,545 | 7/1973 | Velkoff | 431/2 |
| 3,943,407 | 3/1976 | Bolasny | 123/119 E X |

*Primary Examiner*—Edgar W. Geoghegan
*Attorney, Agent, or Firm*—Melville, Strasser, Foster & Hoffman

[57] ABSTRACT

Method and apparatus to improve the energy yield of a reaction, particularly a combustion process. When used in a heating system in which fuel is burned, a burner sprays fuel and combustion supporting gas, preferably air, into the reaction zone inside a combustion chamber. An electromagnetic radiation of which the frequency range is 8800 Mc/s ± 10% corresponding to the maximum motion which may be imparted to the reactants of the molecules is directed at the reactants, by an antenna whose axis intersects the axis of the burner inside the reaction zone. A dissociable substance, preferably water with a surface active agent, is used as an additive and injected towards the reaction zone. An electrostatic field is provided around the spray of fuel leaving the burner by a metal ring at a potential of 300 to 25,000 V.

17 Claims, 1 Drawing Figure

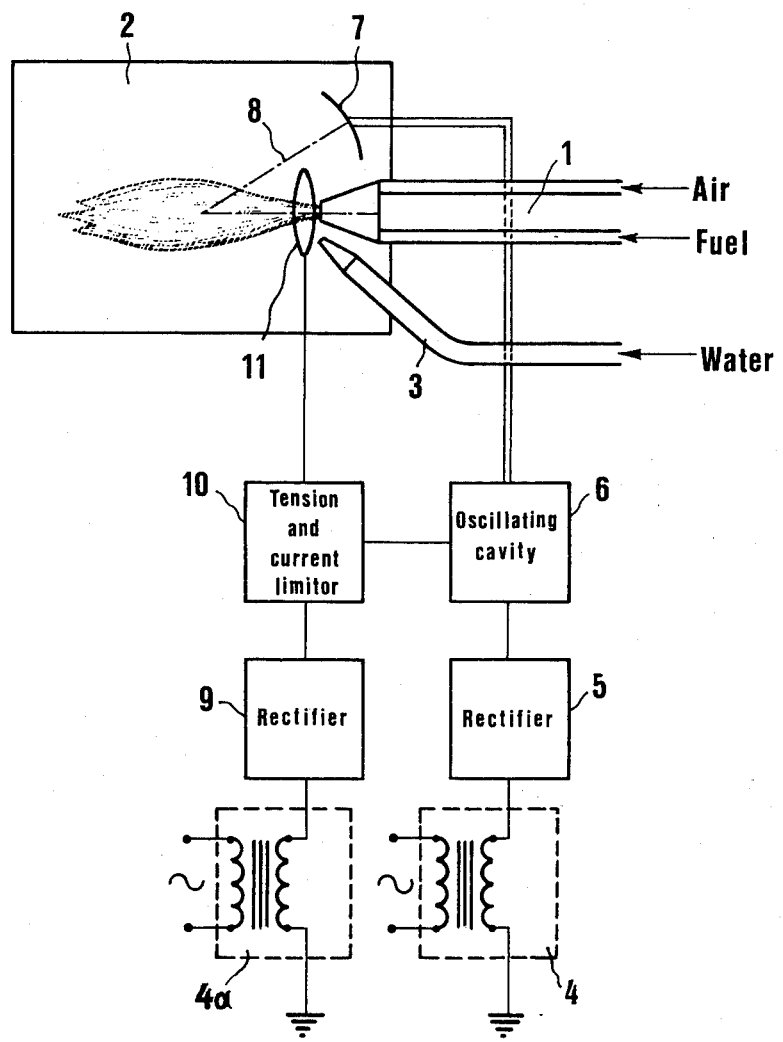

METHOD AND APPARATUS FOR IMPROVING THE ENERGY YIELD OF A REACTION

The present invention relates to a method of improving the energy yields of reactions, particularly combustion.

In reactions such as the combustion of hydrocarbons, it has been known for a long time that the reaction between the combustible or fuel and the combustion supporting gas occurs progressively with the destruction of particles or droplets of the fuel, formation of intermediaries in chains and, normally, the production of unburnt residues. If said production is eliminated by using an excess of the combustion supporting gas (air), there results a loss in the energy yield.

It is also known, and it makes good sense, that a reaction is more complete and faster when the reactants are mixed better initially. It has been proposed to improve the mixing of the reactants by vibrations of variable frequency, and yet, here again, the complications of the equipment override in general the corresponding gain. Only simple improvements relative to the shape and arrangements of the tuyeres, for ameliorating the turbulence, have really been accepted in practice.

For some time it has also been known that it is possible to improve a combustion process by adding a substance in the presence of the fuel which partially dissociates, at a temperature below that of the combustion reaction, the products of dissociation recombining in the vicinity of the flame, with themselves and the intermediary products of combustion. The simplest such additive is water. Nevertheless the energy gain afforded by water is very substantially less than might be hoped, therefore hardly compensating for the added complication due to the addition of water. Accordingly, such a method has not achieved wide acceptance.

The preceding is not only true for a combustion process but also for all other similar reactions.

The idea which was the starting point for the present invention is that additives such as water are far from as effective as they could be because the motion imparted to the molecules of the solid or liquid reactants has been heretofore very small and inadequate to dislodge the particles and droplets to the point of permitting them to react fully with the additive.

We have surprisingly and unexpectedly discovered that the maximum thermal or ionic motion imparted to substantially all the substances capable of reacting is located in the frequency band of 8800 Mc/s ± 10%.

Up until the present day it was not easy to obtain such elevated frequencies, but recently apparatus have been made available enabling the production and transmission of such super high frequencies, in the radar range, economically, at suitable levels of power.

In the method according to the invention, before reacting the reactants, possibly with the addition of an additive whose products of dissociation are capable of recombining at least in part with themselves or with the reactants, the reactants are subjected to an electromagnetic field whose frequency is selected in the band of 8800 Mc/s ± 10% which corresponds to a maximum thermal or ionic motion imparted to the reactants.

In case of the combustion of hydrocarbons, the preferred additive is water to which a surface active agent such as "Teepol", a trademarked product distributed by "Compagnie Francaise des Produits Chimiques", Shell, Paris, France, is added.

When the reaction is principally or secondarily intended for the recovery of heat, for example the burning of fuel in a boiler for heating, the transmission of heat to recovery surfaces, e.g., the walls and tubes of the boiler, is greatly improved by subjecting the reaction zone or area to an electrostatic field at a voltage ranging between 300 and 15,000 V. The effect of such a field is to cause an ionic dispersion, in the reaction zone then towards the walls, of the mixture of reactants which has been highly ionized due to the simultaneous effect of the electromagnetic field and reaction. A potential below 300 V is not very effective, whereas a potential above 15,000 V generates premature and incomplete combustion after a spontaneous ionization. In an internal combustion engine, potentials may range up to 25,000 V.

One of the effects of the addition of water in such a case is that since the dielectric constant of the hydrocarbon fuel and combustion supporting gas is in general even less than about 1/40 that of water, a molecular focusing is brought about by the effect on the rate of propagation of the electromagnetic wave which is given by the formula:

$$v = 1/\sqrt{E\mu}$$

where E is the absolute dielectric constant of the medium and $\mu$ is the magnetic permeability of the medium.

From another standpoint, the specific heat of the combustion supporting gases is in general very much less than that of water and hydrogen, the presence of water, whether dissociated or not, improves the transmission of energy.

According to a preferred embodiment for use in a heating system including a boiler utilizing fuel oil comprising a conventional burner 1 which injects fuel and air into the combustion chamber 2 and an injector 3 which injects water, to which a surface active agent has been added, as a pressurized spray phase. The flow rate of the sprayed water is at most 20% by weight that of the fuel injected.

The super high frequency generator set at a central frequency of 8800 Mc/s comprises an isolation voltage transformer 4. A fixed voltage rectifier 5, an oscillating cavity 6 with a pulse generator and horn type waveguide antenna 7 which extends into the combustion chamber to the vicinity of the burner so that its axis 8 intersects the axis of the burner in the middle of the flame. The consumption of the super high frequency generator is about 215 volt-amperes for domestic use.

The electrostatic generator comprises a special isolation voltage transformer 4a, a special voltage rectifier 9, a voltage and current limiter 10, and an insulated metal ring 11 disposed in front of the tip of the burner and having a diameter 15mm larger than the maximum cross-sectional dimension of the conical spray of combustion reactants in the same plane. The output voltage is adjustable between 500 and 15,000 V, the current variable between 0.1 and 0.5 milliamps. The power consumed is 17 volt-amperes for domestic use.

Although the preceding example is relative to a boiler of a heating system it is to be noted that the invention is particularly well suited for internal combustion engines where it is possible to achieve in addition to an improved energy yield, an appreciable gain in the regularity of combustion and nearly total elimination of unburnt residues.

What we claim is:

1. A method of improving the energy yield of a reaction between reactants, comprising providing electromagnetic radiation the frequency of which substantially corresponds to the maximum thermal or ionic motion of the molecules of said reactants, and directing said electromagnetic radiation towards said reactants while allowing the reaction to proceed.

2. A method according to claim 1, the frequency of said electromagnetic radiation being in the band of 8800 Mc/s ± 10%.

3. A method according to claim 2, further comprising, before applying said electromagnetic radiation, adding an at least partially dissociable additive at a temperature below the temperature of reaction of said reaction, and allowing the products of dissociation to recombine thereafter.

4. A method according to claim 3, further comprising the products of dissociation recombining with themselves.

5. A method according to claim 3, further comprising the products of dissociation recombining with the products of said reaction.

6. A method according to claim 3, further comprising the products of dissociation recombining during said reaction.

7. A method according to claim 3, further comprising the products of dissociation recombining after said reaction.

8. A method according to claim 3, the additive being a substance the products of dissociation of which are oxygen and hydrogen.

9. A method according to claim 3, the additive being water.

10. A method according to claim 2, further comprising producing an electrostatic field having a potentional ranging between 300 and 25,000 V, and applying said electrostatic field to said reactants.

11. A method according to claim 2, said reaction being combustion and said reactants including at least one hydrocarbon fuel and a combustion supporting gas.

12. An apparatus for improving the energy yield of a combustion process comprising a combustion chamber, a burner extending inside said combustion chamber for spraying fuel and a combustion supporting gas into a reaction zone in said combustion chamber, means for supplying fuel and combustion supporting gas to said burner, means for generating a super high frequency in the band of 8800 Mc/s ± 10%, and means for directing said super high frequency towards said combustion zone.

13. An apparatus according to claim 12, wherein said means for directing the super high frequency is an antenna having an axis intersecting the axis of said burner inside said combustion zone.

14. An apparatus according to claim 13, wherein wave guide means carries the super high frequency from said means for generating to said antenna.

15. An apparatus according to claim 12, further comprising means for injecting an additive into said combustion zone.

16. An apparatus according to claim 12, further comprising means for producing and applying an electrostatic field in the vicinity of said reaction zone.

17. An apparatus according to claim 16, wherein the last mentioned means include a metal ring arranged inside said combustion chamber and extending round the spray of fuel leaving said burner, and means electrically isolating said metal ring.

* * * * *